United States Patent [19]

Mizusawa et al.

[11] Patent Number: 4,500,138
[45] Date of Patent: Feb. 19, 1985

[54] BRAKE OIL PRESSURE CONTROLLING VALVE DEVICE FOR VEHICLES

[75] Inventors: Mitutoyo Mizusawa; Masao Fujisawa, both of Ueda, Japan

[73] Assignee: Nissin Kogyo Kabushiki Kaisha, Nagano, Japan

[21] Appl. No.: 492,423

[22] Filed: May 6, 1983

[30] Foreign Application Priority Data

May 7, 1982 [JP] Japan .................................. 57-76209
May 26, 1982 [JP] Japan .................................. 57-89392

[51] Int. Cl.³ ............................ B60T 8/02; B60T 8/26
[52] U.S. Cl. ..................................... 303/6 C; 188/349; 303/115; 303/116; 303/119
[58] Field of Search ................... 303/6 C, 24, 92, 115, 303/119, 6 R, 116, 93, 100, 22 R; 188/349, 181, 195

[56] References Cited

U.S. PATENT DOCUMENTS

| | | | |
|---|---|---|---|
| 3,695,732 | 10/1972 | Stelzer | 303/6 C X |
| 3,795,423 | 3/1974 | Shields et al. | 303/115 X |
| 3,825,308 | 7/1974 | Kasselmann et al. | 303/6 C X |
| 4,203,627 | 5/1980 | Kono | 303/6 C |

FOREIGN PATENT DOCUMENTS 2047366 11/1980 United Kingdom ............... 303/6 C
2065251 6/1981 United Kingdom ............... 303/6 C

*Primary Examiner*—Douglas C. Butler
*Attorney, Agent, or Firm*—Armstrong, Nikaido, Marmelstein & Kubovcik

[57] ABSTRACT

In a brake oil pressure controlling valve device for vehicles of the type wherein a reducing valve adapted to proportionally reduce output oil pressure from a master cylinder to transmit it to a rear wheel brake and a pressure adjusting spring for urging the reducing valve in the valve opening direction and determining the reduction starting pressure thereof, are interposed in an oil path connecting between an output port of the master cylinder and the rear wheel brake, the disclosed valve device is further provided with: a pressure reducing piston which is normally held by virtue of resilient force of a set spring at its advanced limit position where the reducing valve is made open and which is retreated to close the reducing valve and to reduce oil pressure on the output side of the reducing valve when the resilient force of the set spring is released; a controlling oil pressure chamber supplied with oil pressure from an oil pressure source when a rear wheel is about to come into a locked state; and a controlling piston operable with oil pressure within the controlling oil pressure chamber so as to release the resilient force of the set spring from the pressure reducing piston.

6 Claims, 2 Drawing Figures

BRAKE OIL PRESSURE CONTROLLING VALVE DEVICE FOR VEHICLES

BACKGROUND OF THE INVENTION

1. Field of the Invention

This invention relates to a brake oil pressure controlling valve device for vehicles in which oil pressure supplied for actuating a rear wheel brake is made to be reduced to a level lower than that of oil pressure for actuating a front wheel brake.

2. Description of the Prior Art

There is known a brake oil pressure controlling valve device of the kind which is constructed as follows. A valve housing is interposed in an oil path connecting an output port of a master cylinder and the rear wheel brake, and the valve housing is provided therein with a reducing valve which can proportionally reduce output oil pressure from the output port to transmit the reduced oil pressure to the rear wheel brake, and with a pressure adjusting spring which urges the reducing valve in the valve opening direction for determining the reduction starting pressure thereof. According to such a brake oil pressure controlling valve device, when braking input larger than a predetermined value is applied, the front wheel brake is adapted to be actuated with relatively high pressure, which front wheel brake is disposed on the side of the vehicle body where the downward load of the body is increased upon braking, while the rear wheel brake which is disposed on the side of the vehicle body where the downward load is decreased upon braking is adapted to be actuated with relatively low pressure. Thus, there is obtained such an advantage that brake can be applied with good efficiency.

However, even with use of a brake oil pressure controlling valve device of the mentioned type, the rear wheel may be brought into a locked state to lower brake efficiency when braking input is too large or when condition of the road surface is bad.

SUMMARY OF THE INVENTION

Therefore, it is an object of this invention to provide a simple and effective brake oil pressure controlling valve device which can perform an anti-lock function without impairing the aforesaid advantage and which can avoid what is called 'a kick-back phenomenon' where controlling oil pressure is transmitted from the reducing valve side to the master cylinder side at the time of anti-lock controlling.

To achieve the above object, according to a first feature of this invention, there is proposed an improved brake oil pressure controlling valve device for vehicles of the type wherein a valve housing is interposed in an oil path connecting an output port of a master cylinder and a rear wheel brake, the valve housing being provided therein with a reducing valve adapted to proportionally reduce output oil pressure from the output port to transmit the thus reduced oil pressure to the rear wheel brake, and with a pressure adjusting spring for urging the reducing valve in the valve opening direction and determining a reduction starting pressure thereof, the improvement wherein the valve housing is further provided therein with: a pressure reducing piston which is normally held by virtue of resilient force of a set spring at its advanced limit position where the reducing valve is made open and which is retreated, when resilient force of the set spring is released, to close the reducing valve and reduce pressure on the output side of the reducing valve; a controlling oil pressure chamber supplied with oil pressure from an oil pressure source when a rear wheel is about to come into a locked state; and a controlling piston operable with oil pressure within the controlling oil pressure chamber to allow the reducing valve to be released from the resilient force of the set spring.

Furthermore, according to a second feature of this invention, there is proposed an improved brake oil pressure controlling valve device for vehicles of the type wherein a valve housing is interposed in an oil path connecting an output port of a master cylinder and a rear wheel brake, the valve housing being provided therein with a reducing valve adapted to proportionally reduce output oil pressure from the output port to transmit the reduced oil pressure to the rear wheel brake, and with a pressure adjusting spring for urging the reducing valve in the valve opening direction and determining a reduction starting pressure thereof, the improvement wherein the valve housing is further provided therein with: a controlling oil pressure chamber which is normally supplied with oil pressure from an oil pressure source and is adapted to release the oil pressure to an oil tank when a rear wheel is about to come into a locked state; and a controlling piston which is held at its advanced limit position where the reducing valve is made open when subjected to oil pressure within the controlling oil pressure chamber, and which is retreated to close the reducing valve and reduce pressure on the output side of the reducing valve when released from the oil pressure within the controlling oil pressure chamber.

With this construction, when the rear wheel is about to be locked, oil pressure for actuating the rear wheel brake is reduced through operation of the controlling piston thereby to avoid the occurrence of a lock phenomenon, and during such anti-lock controlling the reducing valve is held at its retreated limit position by output oil pressure from the master cylinder, so that a kick-back phenomenon will not be caused.

Moreover, according to the first feature of this invention, even if an oil hydraulic system for the controlling piston is failed and places the controlling piston in an inoperable state, the pressure reducing piston can be held at the normal advanced position by virtue of resilient force of the set spring. Therefore, the reducing valve can offer the proportional pressure reducing function in a normal manner, thus causing no adverse influence of braking and ensuring the fail-safe operation.

In addition, the anti-lock function can be obtained just by providing the pressure reducing piston, the set spring and the controlling piston additionally to the conventional brake oil pressure controlling valve device so that the construction is remained simple. Also, the additional provision of those components will never impair the specific advantage of the controlling valve device of this type.

Further, according to the second feature of this invention the anti-lock function can be also obtained just by providing the controlling piston additionally to the conventional brake oil pressure controlling valve device. Thus, similarly to the first feature of this invention, it becomes possible to simplify the construction without impairing the specific advantage of the brake oil pressure controlling valve device.

The above and other objects, features and advantages of this invention will be apparent from reading the description of preferred embodiments which will be made in detail hereinafter with reference to the accompanying drawings.

DETAILED DESCRIPTION OF THE INVENTION

In the following, two preferred embodiments of this invention will be explained with reference to the drawings. In those two illustrated embodiments, the corresponding members are designated by the same numerals or symbols.

Figure 1:
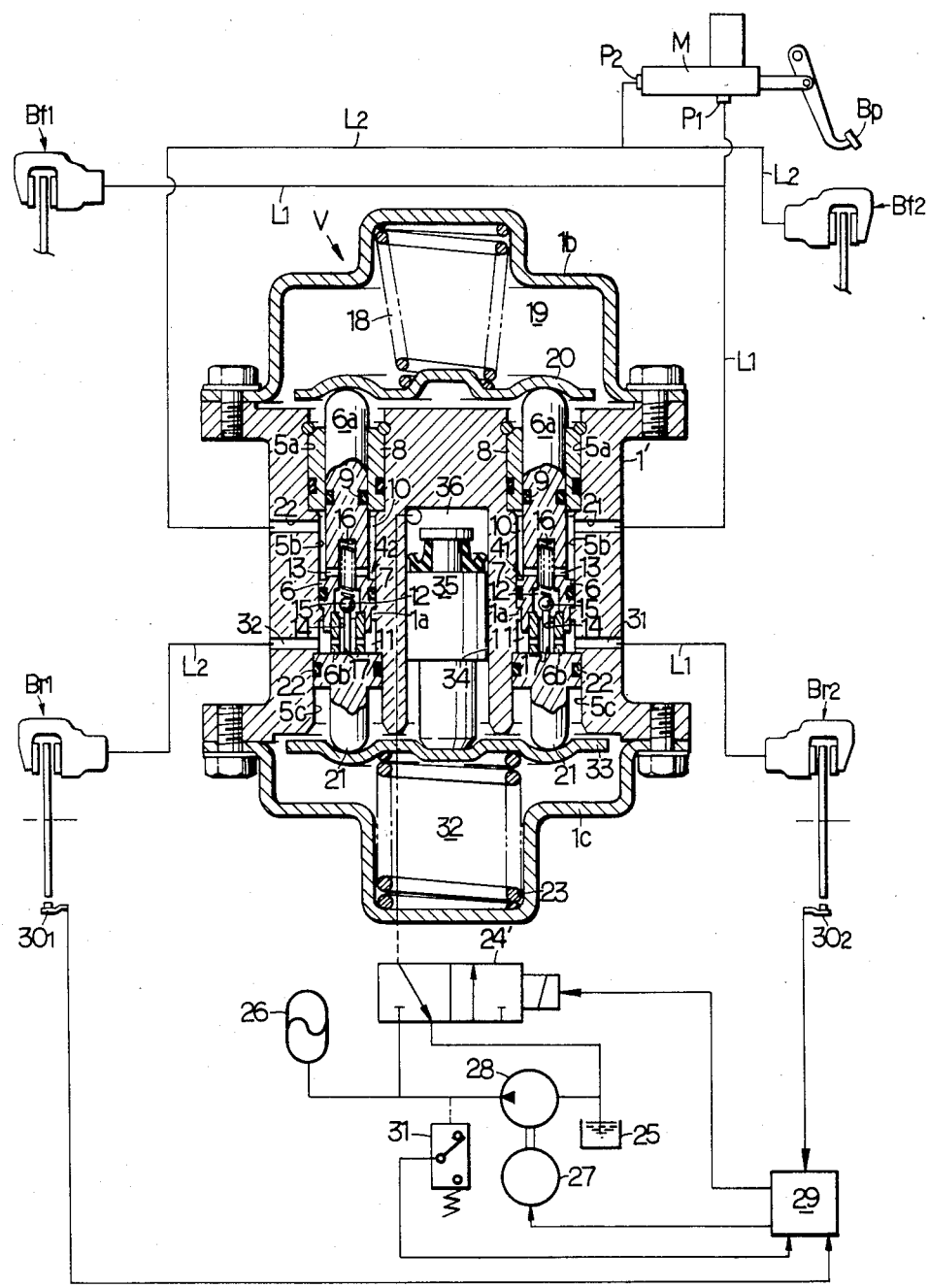
FIG. 1 is an oil hydraulic circuit diagram for an automobile brake equipped with a controlling valve device according to a first embodiment of this invention.

By referring to FIG. 1 there is shown a first embodiment of this invention, designated at M is a well-known tandem type master cylinder operated by a brake pedal Bp, the master cylinder M having first and second output ports $P_1$ and $P_2$ which are independent from each other. Designated at $Bf_1$, $Bf_2$ are left and right front wheel brakes, and $Br_1$, $Br_2$ are left and right rear wheel brakes, respectively. Respective oil pressure operating sections for the left front wheel brake $Bf_1$ and the right rear wheel brake $Br_2$ are connected to a first oil path $L_1$ leading from the first output port $P_1$, while respective oil pressure operating sections for the right front wheel brake $Bf_2$ and the left rear wheel brake $Br_1$ are connected to a second oil path $L_2$ leading from the second output port $P_2$. Therefore, the first and second oil path $L_1$ and $L_2$ constitute a so called X-type piping. A brake oil pressure controlling valve device V is interposed in the first and second oil paths $L_1$ and $L_2$ leading to the right and left rear wheel brakes $Br_2$ and $Br_1$, respectively.

The brake oil pressure controlling valve device V has a valve housing 1 which is rigidly fixed to a vehicular body at a proper position thereof. The valve housing 1 is provided at its right-hand side surface with a first inlet $2_1$ connected to the upstream side portion (i.e., the mastercylinder side portion) of the first oil path $L_1$ and a first outlet $3_1$ connected to the downstream side portion (i.e., the brake side portion) of the same path $L_1$. The housing 1 is also provided at its left-hand side surface with a second inlet $2_2$ connected to the upstream side portion of the second oil path $L_2$ and a second outlet $3_2$ connected to the downstream side portion of the same path $L_2$. First and second reducing valves $4_1$ and $4_2$ adapted to control connection or disconnection between the first inlet $2_1$ and the first outlet $3_1$ and between the second inlet $2_2$ and the second outlet $3_2$, respectively, are disposed in the valve housing 1 side by side.

Both reducing valves $4_1$ and $4_2$ have the same construction, so the description will be made only on the construction of the first reducing valve $4_1$.

In the valve housing 1 is formed a stepped cylinder bore which consists of a front larger diameter cylinder bore portion 5a, an intermediate smaller diameter cylinder bore portion 5b and a rear larger diameter cylinder bore portion 5c. A bearing 8 is fitted in the front cylinder bore portion 5a, while a pressure receiving piston 6 is slidably fitted in the intermediate cylinder bore portion 5b through a seal member 7. A stopper 1a adapted to determine the retracted limit position of the piston 6 is projected from the inner peripheral wall of the intermediate cylinder bore portion 5b. In the rear cylinder bore portion 5c there is slidably fitted a pressure reducing piston 21 through a seal member 22. The pressure reducing piston 21 is normally held by resilient force of a set spring 23 (described later) at its advanced limit position where it abuts against the front end wall of the rear cylinder bore portion 5c.

The pressure receiving piston 6 has a piston rod 6a projecting from the front end face thereof and a valve seat member 6b projecting from the rear end face thereof. The intermediate portion of the piston rod 6a is supported by the bearing 8 through a seal member 9 in a slidable manner. With this construction, in the cylinder bore portion 5b there are defined between the pressure receiving piston 6 and the bearing 8 a front input oil pressure chamber 10 communicating with the first inlet $2_1$, and between the pressure receiving piston 6 and the pressure reducing piston 21 a rear output oil pressure chamber 11 communicating with the first outlet $3_1$.

The pressure receiving piston 6 is formed with a valve chamber 12 which is communicated with the input oil pressure chamber 10 via a through hole 13 bored in the piston rod 6a and also communicated with the output oil pressure chamber 11 via a valve hole 14 bored in the valve seat member 6b. The valve chamber 12 houses therein a spherical valve 15 which is adapted to seat on the valve seat member 6b to close the valve hole 14, and a valve closing spring 16 which urges the spherical valve 15 toward the closed side. The valve 15 is integrally provided with a valve opening rod 17 extending to loosely penetrate through the valve hole 14. When the pressure receiving piston 6 locates at its retracted limit position, the valve opening rod 17 is pushed by the pressure reducing piston 21 so as to open the valve 15.

At the front portion of the valve housing 1 there is fitted a cover 1b to define a front spring chamber 19 which houses therein a pressure adjusting spring 18. In this chamber 19 a lever 20 is provided and has its both ends connected to the front ends of two piston rods 6a, 6a of the first and second reducing valves $4_1$ and $4_2$ in a swingable manner while resilient force of the pressure adjusting spring 18 is applied to the central portion of the lever 20 so that the respective pressure receiving pistons 6, 6 are pushed into their retreated limit positions.

On the other hand, at the rear portion of the valve housing 1 there is fitted a cover 1c to define a rear spring chamber 32 which houses therein a set spring 23. In this chamber 32, a bridge plate 33 is provided and has its both ends connected separably or integrally to the rear ends of two pressure reducing pistons 21, 21 of the first and second reducing valves $4_1$ and $4_2$, while resilient force of the set spring 23 is applied to the central portion of the bridge plate 33 so that both pressure reducing pistons 21, 21 are pushed into and held at their advanced limit positions. On this occasion, the resilient force of the set spring 23 is selected to be greater than the retreating force exerted by both pressure reducing pistons 21, 21 due to the maximum oil pressure within the left and right output oil pressure chambers 11, 11.

The valve casing 1 is further formed in its intermediate portion between the left and right cylinder bore portions 5b, 5b with another cylinder bore 34 which extends in parallel to those cylinder bore portions $5b$, $5b$ and has its front end closed. In the cylinder bore 34 there is slidably fitted a controlling piston 35 which abuts against the central portion of the bridge plate 33. A controlling oil pressure chamber 36 is defined between the controlling piston 35 and the front end wall of the cylinder bore 34.

The contolling oil pressure chamber 36 is connected to an oil tank 25 and an accumulator 26 through a solenoid valve 24. More specifically, the chamber 36 is communicated with the oil tank 25 when the solenoid valve 24 is deenergized, and it is communicated with the accumulator 26 when the solenoid valve 24 is energized. The accumulator 26 stores therein a discharged oil from a hydraulic pump 28 which is driven by an electric motor 27.

A control circuit 29 is provided for controlling the solenoid valve 24. The circuit 29 receives signals from first and second wheel speed sensors $30_1$ and $30_2$ adapted to detect rotational speeds of the left and right rear wheel respectively, and then generates an energization signal to the solenoid valve 24 based on such a judgement that the rear wheels have come near a locked state. The control circuit 29 also receives a signal from a pressure sensor 31 adapted to detect oil pressure in an oil hydraulic circuit connected to the accumulator 26, and then generates a stop signal to the electric motor 27 based on such a judgement that a predetermined oil pressure has been stored in the accumulator 26.

The operation of this embodiment will be described hereinafter. When the brake pedal Bp is stepped on to operate the master cylinder M during traveling of the vehicle, oil pressures are respectively output from the first and second output ports $P_1$ and $P_2$. The output oil pressure from the first output port $P_1$ is transmitted to the left front wheel brake $Bf_1$ through the first oil path $L_1$ and, at the same time, to the right rear wheel brake $Br_2$ through the upstream portion of the first oil path $L_1$, the input oil pressure chamber 10, valve chamber 12, valve hole 14 and the output oil pressure chamber 11 of the first reducing valve $4_1$ as well as the downstream portion of the first oil path $L_1$, thereby to actuate those brakes $Bf_1$ and $Br_2$, respectively. Meanwhile, the output oil pressure from the second output port $P_2$ is transmitted to the right front wheel brake $Bf_2$ through the second oil path $L_2$ and, at the same time, to the left rear wheel brake $Br_1$ through the upstream portion of the second oil path $L_2$, the input oil pressure chamber 10, valve chamber 12, valve hole 14 and the output oil pressure chamber 11 of the second reducing valve $4_2$ as well as the downstream portion of the second oil path $L_2$, thereby to actuate those brakes $Bf_2$ and $Br_1$, respectively.

In this connection, oil pressures for actuating the front wheel brakes $Bf_1$ and $Bf_2$ are always increased along with increase of output oil pressures from the first and second output ports $P_1$ and $P_2$, but oil pressures for actuating the rear wheel brakes $Br_1$ and $Br_2$ are controlled by the first and second reducing valves $4_1$ and $4_2$ as follows, after once the output oil pressures from the first and second output ports $P_1$ and $P_2$ exceed a predetermined value.

First, when as a result of an increase in output oil pressure from the first output port $P_1$ oil pressure within the input and output oil pressure chambers 10 and 11 of the first reducing valve $4_1$ reaches a predetermined value and hence a forward pressing force acting on the pressure receiving piston 6 due to the oil pressure at that time (i.e., a force corresponding to the product of the oil pressure multiplied by the sectional area of the piston rod $6a$) overcomes a valve opening force acting on the pressure receiving piston 6 by the pressure adjusting spring 18 (a valve opening force for each pressure receiving piston 6 is given by a half of the preset load of the pressure adjusting spring 18, because the spring 18 imparts the valve opening force to the left and right two pressure receiving pistons 6, 6 simultaneously through the lever 20), the pressure receiving piston 6 is moved forward while tilting the lever 20 to some degree, so that the valve seat member $6b$ is engaged with the valve 15 to close the valve hole 14. Upon this engagement, communication between the input and output oil pressure chambers 10 and 11 is interrupted. Thereafter, when output oil pressure from the first output port $P_1$ is further increased and hence a rearward pressing force acting on the pressure receiving piston 6 due to the oil pressure within the input oil pressure chamber 10 (i.e., a force corresponding to the product of the pressure within the input oil pressure chamber 10 multiplied by a difference between the sectional areas of the larger diameter portion of the pressure receiving piston 6 and the piston rod $6a$) overcomes a forward pressing force acting on the pressure receiving piston 6 due to the oil pressure within the output oil pressure chamber 11 (i.e., a force corresponding to the product of the oil pressure within the output oil pressure chamber 11 multiplied by the sectional area of the larger diameter portion of the pressure receiving piston 6), the receiving piston 6 is now pushed backward, so that the valve 15 departs from the valve seat member $6b$ and both oil pressure chambers 10 and 11 are communicated with each other once again. Thus, oil pressure within the output oil pressure chamber 11 is increased. With this increase in oil pressure, a forward pressing force acting on the pressure receiving piston 6 due to the oil pressure within the output oil pressure chamber 11 is increased immediately, so that the pressure receiving piston 6 is now moved forward once again and communication between both oil pressure chambers 10 and 11 is interrupted. Subsequently, the similar operation will be repeated in accordance with the increase in output oil pressure from the first output port $P_1$. As a result, output oil pressure from the first output port $P_1$ is proportionally reduced and then transmitted to the right rear wheel brake $Br_2$.

On the other hand, it will be apparent that when output oil pressure from the second output port $P_2$ exceeds a predetermined value, the second reducing valve $4_2$ is operated similarly to the first reducing valve $4_1$ and hence output oil pressure from the second output port $P_2$ is proportionally reduced and then transmitted to the left rear wheel brake $Br_1$.

In the above, reduction starting pressures for the respective reducing valves $4_1$ and $4_2$ are determined by the sectional areas of the respective piston rods $6a$ and the preset load of the pressure adjusting spring 18, while the reduction ratios thereof are determined by the ratio of a difference between the sectional areas of the larger diameter portion of the pressure receiving piston 6 and the piston rod $6a$ with respect to the sectional area of the piston rod $6a$.

In the process of such braking, when the rear wheel is about to be locked, an exciting signal is issued from the control circuit 29 to the solenoid valve 24, whereby the solenoid valve 24 is energized and shifted to a position where the accumulator 26 is communicated with the controlling oil pressure chamber 36. Accordingly, oil pressure within the accumulator 26 is now supplied to the controlling oil pressure chamber 36. Then, the controlling piston 35 receiving thus supplied oil pressure is moved backward so as to compress the set spring 23 through the bridge plate 33 and to release the pressing force of the set spring 23 acting on both pressure reducing pistons 21, 21. Therefore, each of the pressure reducing pistons 21 is retreated by virtue of oil pressure within the corresponding output oil pressure chambers 11. But, the pressure receiving piston 6 is stopped at the position where it abuts against the stopper 1a. i.e., at the limit position of its retreat movement, so that the valve opening rod 17 is released from the pressing force of the pressure reducing piston 21, thereby to allow the valve 15 to be closed. Subsequent to the closing of the valve 15, oil pressure within the output oil hydraulic chamber 11 is reduced in accordance with retreat of the pressure reducing piston 21. As a result, braking force exerted by the rear wheel brakes $Br_1$ and $Br_2$ is decreased and the rear wheels are prevented from coming into a locked state. During the above process, since the pressure receiving piston 6 is held due to oil pressure within the input oil pressure chamber 10 at the position where it abuts against the stopper 1a, an operating force of the controlling piston 35 is not transmitted to the pressure receiving piston 6. That is, there will occur no kickback phenomenon.

When the rear wheels are avoided from coming into a locked state, the control circuit 29 stops to produce an exciting signal, whereupon the solenoid valve 24 is deenergized to return back to the original position and oil pressure within the controlling oil pressure chamber 36 is released to the oil tank 25. Therefore, the controlling piston 35 is stopped its operation and both pressure reducing pistons 21, 21 are brought into their original advanced limit positions once again by virtue of resilient force of the set spring 23. With this, the respective reducing valves $4_1$ and $4_2$ are returned to the normal operating state so as to restore the braking force of the rear wheel brakes $Br_1$ and $Br_2$.

Although, in the above-mentioned embodiment, the left and right pressure reducing pistons 21, 21 are connected with each other through the bridge plate 33 and the set spring 23 as well as the controlling piston 35 are each provided one in number for common use with the pressure reducing pistons 21, 21, those spring 23 and piston 35 can be provided for each pressure reducing piston 21 without using the bridge plate 33. In this case, the pressure reducing piston can be formed integrally with the controlling piston.

Figure 2:
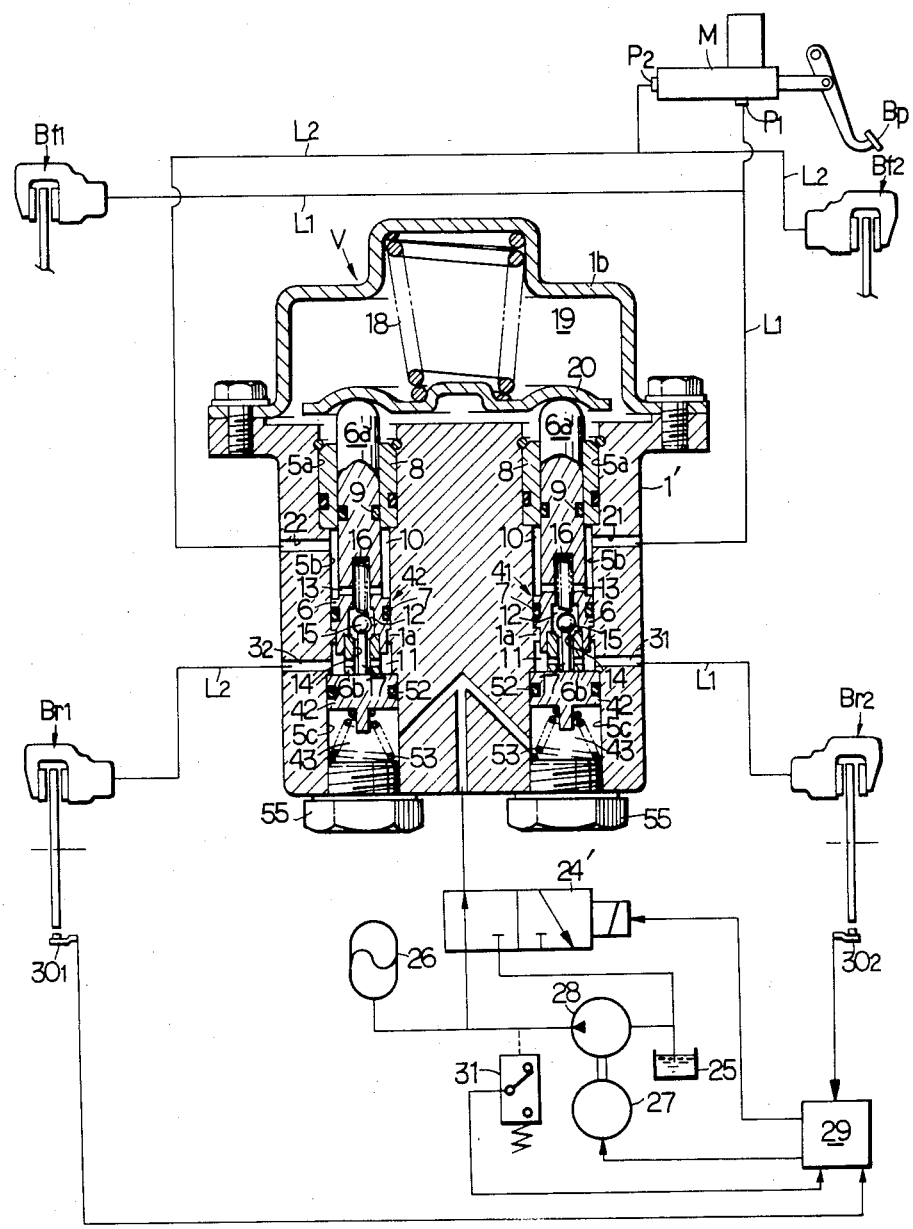
FIG. 2 is an oil hydraulic circuit diagram for an automobile brake equipped with a controlling valve device according to a second embodiment of this invention.

A second embodiment shown in FIG. 2 will be described hereinafter. In this embodiment, similarly to the foregoing first embodiment, the first output $P_1$ of the master cylinder M is connected with the left front wheel brake $Bf_1$ and the right rear wheel brake $Br_2$ through the first oil path $L_1$ while the second output port $P_2$ thereof is connected with the right front wheel brake $Bf_2$ and the left rear wheel brake $Br_2$ through second oil path $L_2$, so that both oil paths $L_1$ and $L_2$ constitute a so called X-type piping. The brake oil pressure controlling valve device V is interposed in these oil paths $L_1$ and $L_2$ leading to the right and left rear wheel brakes $Br_2$ and $Br_1$, respectively.

According to the second embodiment, in each rear cylinder bore portion 5c of the stopped cylinder bore formed in the valve housing 1' there are accommodated a controlling piston 42 through a seal member 52 in a slidable manner and a spring 53 adapted to resiliently bias the piston 42 forward. With this construction, the controlling piston 42 is normally held by virtue of resilient force of the spring 53 at its advanced limit position where it abuts against the front end wall of the cylinder bore portion 5c. When the pressure receiving piston 6 locates at its retreated limit position, the controlling piston 42 pushes the valve opening rod 17 provided in the pressure receiving piston 6, thereby to open the valve 15 and to communicate both input and output oil pressure chambers 10 and 11 with each other.

The rear end of the cylinder bore portion 5c is closed by a screwed plug 55, and a controlling oil pressure chamber 43 is defined between the screwed plug 55 and the controlling piston 42.

The controlling oil pressure chambers 43 of the first and second reducing valves $4_1$ and $4_2$ are both connected to the oil tank 25 and the accumulator 26 through the solenoid valve 24. More specifically, each of the chambers 43 is communicated with the accumulator 26 when the solenoid valve 24' is deenergized, while it is communicated with the oil tank 25 when the solenoid valve 24' is energized. The accumulator 26 stores therein a discharged oil from the hydraulic pump 28 which is driven by the electric motor 27.

The solenoid valve 24' is normally deenergized so as to introduce oil pressure within the accumulator 26 into each of the controlling oil pressure chambers 43. In this embodiment, the oil pressure within the accumulator 26 is selected to be higher than the maximum oil pressure within the output oil pressure chamber 11. Therefore, except for the case where introduction of oil pressure into the controlling oil pressure chamber 43 is stopped, the controlling piston 42 is always pushed into the illustrated advanced limit position due to the action of oil pressure within the controlling oil pressure chamber 43 and will never be retreated, no matter how high the oil pressure within the output oil pressure chamber 11 may be increased.

The operation of the second embodiment will be now described. In the normal process of braking, through the operation of the first and second reducing valves $4_1$ and $4_2$ having the same structure as those in the above-mentioned first embodiment, output oil pressures from the master cylinder M are proportionally reduced and then transmitted to the rear wheel brakes $Br_2$ and $Br_1$, respectively. In the process of such braking, when the rear wheel is about to be locked, an exciting signal is produced from the control circuit 29 to the solenoid valve 24', whereby the solenoid valve 24' is energized and shifted to a position where the controlling oil pressure chamber 43 is communicated with the oil tank 25. Accordingly, oil pressure within the controlling oil pressure chamber 43 is now released to the oil tank 25. Then, oil pressure within the output oil pressure chamber 11 allows the controlling piston 42 to retreat against the resilient force of the spring 53, so that the valve opening rod 17 is released from the pressing force of the controlling piston 42, thereby to permit the valve 15 to be closed. Thus, oil pressure within the output oil pressure chamber 11 is reduced necessarily to decrease the braking force of the rear wheel brakes $Br_1$ and $Br_2$, whereby the rear wheels are prevented from coming into a locked state. During such reduction in pressure within the output oil pressure chamber 11, the pressure receiving piston 6 is held by the oil pressure within the input oil pressure chamber 10 at the position where it abuts against the stopper 1a, i.e., at its retreated limit position.

When the rear wheels are avoided from coming into a locked state, the control circuit 29 stops producing the exciting signal, whereupon the solenoid valve 24' is deenergized to return back to the original position and oil pressure within the accumulator 26 is now introduced into the controlling oil pressure chambers 43 once again. Thus, the controlling pistons 42 are pushed into its advanced limit position once again. Consequently, the respective reducing valves $4_1$ and $4_2$ are returned to the normal operating state so as to restore the braking force of the rear wheel brakes $Br_1$ and $Br_2$.

What is claimed is:

1. In an improved brake oil pressure controlling valve device for vehicles of the type wherein a valve housing is interposed in an oil path connecting an output port of a master cylinder and a rear wheel brake, said valve housing being provided therein with a reducing valve adapted to proportionally reduce output oil pressure from said output port to transmit the thus reduced oil pressure to said rear wheel brake, and with a pressure adjusting spring for urging said reducing valve in the valve opening direction and determining a reduction starting pressure thereof, the improvement wherein said valve housing is further provided therein with:
    a pressure reducing piston which is normally held by virtue of resilient force of a set spring at its advanced limit position where said reducing valve is made open and which is retreated, when the resilient force of said set spring is released, to close said reducing valve and reduce pressure on the output side of said reducing valve;
    a controlling oil pressure chamber supplied with oil pressure from on oil pressure source when a rear wheel is about to come into a locked state;
    a controlling piston operable with oil pressure within said controlling oil pressure chamber to allow said reducing valve to be released from the resilient force of said set spring; and
    wherein said output port of the master cylinder is composed of a first output port and a second output port, said rear wheel brake is composed of a right rear wheel brake and a left rear wheel brake, said oil path is composed of a first oil path connecting said first output port with said right rear wheel brake and a second oil path connecting said second output port with said left rear wheel brake, said reducing valve is composed of a pair of first and second reducing valves which are provided on the right and left side portions of said valve housing, respectively, said first reducing valve is interposed in said first oil path, said second reducing valve is interposed in said second oil path, a left front wheel brake is connected to said first oil path on the upstream side of said first reducing valve, and a right front wheel brake is connected to said second oil path on the upstream side of said second reducing valve.

2. A brake oil pressure controlling valve device for vehicles according to claim 1, wherein said valve housing is formed therein with a pair of right and left stepped cylinder bores each of which consists of a front larger diameter cylinder bore portion, an intermediate smaller diameter cylinder bore portion and a rear larger diameter cylinder bore portion and which have said first and second reducing valves slidably fitted therein, respectively, and further each has a pressure receiving piston slidably fitted therein; each of said pressure reducing pistons is slidably fitted in the rear larger diameter cylinder bore portion of said stepped cylinder bore through a seal member; at an intermediate portion between said pair of right and left stepped cylinder bores there is formed a single cylinder bore which extends in parallel to said stepped cylinder bores and has its front end closed while having said controlling piston slidably fitted therein to define said controlling oil pressure chamber between said controlling piston and said closed front end; and said controlling piston is operatively connected with said two pressure reducing pistons through a bridge plate interposed between said controlling piston and said set spring.

3. A brake oil pressure controlling valve device for vehicles according to claim 2, wherein a stopper adapted to determine the retreated limit position of said pressure receiving piston is projected from the inner peripheral wall of said intermediate smaller diameter cylinder bore portion, and said pressure receiving piston is held at the position where it abuts against said stopper when oil pressure is introduced from said oil pressure source to said controlling oil pressure chamber and then said pressure reducing piston is retreated by the action of said controlling piston.

4. In an improved brake oil pressure controlling valve device for vehicles wherein a valve housing is interposed in an oil path connecting an output port of a master cylinder and a rear wheel brake, said valve housing being provided therein with a reducing valve adapted to proportionally reduce output oil pressure from said output port to transmit the thus reduced oil pressure to said rear wheel brake, and with a pressure adjusting spring for urging said reducing valve in the valve opening direction and determining a reduction starting presure thereof, the improvement wherein said valve housing is further provided therein with:
    a controlling oil pressure chamber which is normally supplied with oil pressure from an oil pressure source and is adapted to release the oil pressure to an oil tank when a rear wheel is about to come into a locked state;
    a controlling piston which is held at its advanced limit position where said reducing valve is made open when subjected to oil pressure within said controlling oil pressure chamber, and which is retreated to close said reducing valve and reduce pressure on the output side of said reducing valve when released from the oil pressure within said controlling oil pressure chamber; and
    wherein said output port of the master cylinder is composed of a first output port and a second output port, said rear wheel brake is composed of a right rear wheel brake and a left rear wheel brake, said oil path is composed of a first oil path connecting said first output port with said right rear wheel brake and a second oil path connecting said second output port with said left rear wheel brake, said reducing valve is composed of a pair of first and second reducing valves which are provided on the right and left side portions of said valve housing, respectively, said first reducing valve is interposed in said first oil path, said second reducing valve is interposed in said second oil path, a left front wheel brake is connected to said first oil path on the upstream side of said first reducing valve, and a right front wheel brake is connected to said second oil path on the upstream side of said second reducing valve.

5. A brake oil pressure controlling valve device for vehicles according to claim 4, wherein said valve housing is formed therein with a pair of right and left stepped cylinder bores each of which consists of a front larger diameter cylinder bore portion, an intermediate smaller diameter cylinder bore portion and a rear larger diameter cylinder bore portion, and which have said first and second reducing valves slidably fitted therein, respectively, and further each has a pressure receiving piston slidably fitted therein; in the rear larger diameter cylinder bore portion of each of said stepped cylinder bores is fitted said controlling piston in a slidable manner through a seal member and also is accommodated a spring adapted to resiliently bias said controlling piston forward; and the rear end of said rear larger diameter cylinder bore portion is closed by a screwed plug thereby defining, said controlling oil pressure chamber between said screwed plug and said controlling piston.

6. A brake oil pressure controlling valve device for vehicles according to claim 5, wherein a stopper adapted to determine the retreated limit position of said pressure receiving piston is projected from the inner peripheral wall of said intermediate smaller diameter cylinder bore portion, and said pressure receiving piston is held at the position where it abuts against said stopper when oil pressure introduced from said oil pressure source to said controlling oil pressure chamber is released and then said controlling piston is retreated.

* * * * *